(12) United States Patent
Herchenbach et al.

(10) Patent No.: US 7,220,075 B2
(45) Date of Patent: May 22, 2007

(54) COUPLING DEVICE

(75) Inventors: Paul Herchenbach, Ruppichteroth (DE); Karl Coenen, Siegburg (DE); Uwe Bürling, Siegburg (DE)

(73) Assignee: GKN Walterscheid GmbH (DE)

( * ) Notice: Subject to any disclaimer, the term of this patent is extended or adjusted under 35 U.S.C. 154(b) by 7 days.

(21) Appl. No.: 10/853,407

(22) Filed: May 25, 2004

(65) Prior Publication Data

US 2004/0240931 A1    Dec. 2, 2004

(30) Foreign Application Priority Data

May 28, 2003    (DE) ................ 103 24 520

(51) Int. Cl.
*F16D 7/02*    (2006.01)

(52) U.S. Cl. .................. 403/57; 403/327; 464/39; 464/118; 56/DIG. 6

(58) Field of Classification Search ............ 403/56, 403/57, 63, 325, 327; 464/30, 39, 118, 38; 56/DIG. 6

See application file for complete search history.

(56) References Cited

U.S. PATENT DOCUMENTS

| | | | |
|---|---|---|---|
| 2,760,361 A * | 8/1956 | Ruthinger | ............... 464/39 |
| 2,885,232 A | 5/1959 | Eberly | |
| 3,357,206 A * | 12/1967 | Christie | ............... 403/325 |
| 4,349,092 A * | 9/1982 | Geisthoff | ............... 403/325 |
| 4,433,767 A | 2/1984 | Thor | |
| 4,781,662 A | 11/1988 | Mayhew et al. | |
| 5,674,024 A * | 10/1997 | Daumal Castellon | ....... 403/325 |
| 6,152,827 A * | 11/2000 | Muller et al. | ............... 464/30 |

FOREIGN PATENT DOCUMENTS

| | | |
|---|---|---|
| DE | 38 01 459 A2 | 8/1989 |
| DE | 42 05 997 C1 | 3/1993 |
| DE | 198 54 294 C1 | 5/2000 |
| JP | 4-30319 | 11/1992 |

* cited by examiner

*Primary Examiner*—Daniel P. Stodola
*Assistant Examiner*—Michael P. Ferguson
(74) *Attorney, Agent, or Firm*—Harness, Dickey & Pierce, P.L.C.

(57) ABSTRACT

A coupling device used for driving or in the drives of, agricultural implements or machinery, has a first universal joint (2) with a first outer yoke (3) a first inner yoke (4), a second universal joint (5) with a second outer yoke (6) and a second inner yoke (7). A connecting member (8) connects the first inner yoke (4) and the second inner yoke (7) to one another in a rotationally fast way. A first coupling element (12) is connected to the first outer yoke (3) in a rotationally fast way. A pressure spring (16) is axially supported against and pretensioned between a supporting element (15), which forms part of the connecting member (8), and the first coupling element (12). A longitudinal adjusting member enables an axial displacement of the first coupling element (12) relative to the supporting element (15).

7 Claims, 3 Drawing Sheets

COUPLING DEVICE

CROSS-REFERENCE TO RELATED APPLICATIONS

This application claims priority to German Patent Application Nos. 10324520.0-12 filed May 28, 2003, which application is herein expressly incorporated by reference.

FIELD OF THE INVENTION

The invention relates to a coupling device and, more particularly, to a coupling for driving or in the drives of agricultural implements or machinery. For example, the coupling device can be used to connect an implement to a drive where compensation needs to be made for slight angular deviations.

BACKGROUND OF THE INVENTION

A coupling device is known from JP 04-030319 U. The publication shows a universal joint yoke which, via a ball bearing for instance, is rotatably supported around an axis of rotation. In a universal joint yoke bore arranged coaxially relative to the axis of rotation, a first coupling element is axially displaceable and rotationally fast. The pressure spring is supported against the universal joint yoke on the one hand and against the first coupling element on the other hand. Thus, the first coupling element is loaded towards a position which is disengaged relative to the universal joint yoke. On one side facing away from the universal joint yoke, the first coupling element includes axially projecting driving claws. The projecting driving claws are coupled to a second coupling element and engage in gaps between driving claws of the second coupling element. Furthermore, the second coupling element includes a centering projection which projects centrally towards the first coupling element. In the coupled condition, the centering projecting engages a central bore of the first coupling element. A pressure spring initially transfers the second coupling element into a coupling position. Accordingly, the centering projection engages the bore of the first coupling element. The driving claws of the first coupling element and those of the second coupling element frontally abut one another without the two coupling elements engaging one another. By rotating the universal joint yoke, the coupling elements are rotated relative to one another so that the driving claws of the one coupling element are positioned opposite the gaps between the driving claws of the other coupling element. In this position, the spring assembly applies pressure to the first coupling element. As this occurs, the driving claws of the first coupling element engage the gaps between the driving claws of the second coupling element.

SUMMARY OF THE INVENTION

It is an object of the invention to provide a coupling device which compensates for angular deviations between two shafts that are to be connected to one another. The invention prevents a joint of the coupling device, which joint directly adjoins the first coupling element, from being articulated in the uncoupled condition due to gravity.

In accordance with the invention, a coupling device, more particularly used for driving or in a drive of an agricultural implements or machinery, comprises a first universal joint with a first outer yoke and a first inner yoke and a second universal joint with a second outer yoke and a second inner yoke. A connecting member connects the first inner yoke and the second inner yoke to one another in a rotationally fast way. A first coupling element is connected to the first outer yoke in a rotationally fast way. A pressure spring is axially supported against and pre-tensioned between a supporting element and the first coupling element. The supporting element forms part of the connecting member. A longitudinal adjusting member enables an axial displacement of the first coupling element relative to the supporting element.

In this embodiment, the pressure spring has two functions. On the one hand, the pressure spring loads the first coupling element towards a coupling position of the first coupling element. Thus, when coupling a second coupling element, the first coupling element is always held so as to engage the second coupling element. Furthermore, it is possible to achieve automatic coupling when the first coupling element frontally abuts a second coupling element without being coupled. Accordingly, only if the coupling elements are rotated relative to one another into a rotary position are they able to engage one another. On the other hand, the pressure spring ensures that the first universal joint is loaded towards an aligned position. As a result of gravity of the first outer yoke and of the first coupling element, the first universal joint is prevented from being articulated.

The length adjustment enables an axial displacement of the first coupling element relative to the supporting element. The length adjustment can be achieved by axial displacement of the coupling element which is guided on a displacement portion of the first outer yoke. The first inner yoke and the second inner yoke are axially non-displaceably connected to one another.

In order to achieve the shortest possible length, the first inner yoke and the second inner yoke are integrally connected to one another via a base member. The base member acts as the connecting member and thus forms a double yoke. The first inner yoke and the second inner yoke are arranged to face away from one another.

The first coupling element is preferably axially displaceably guided on a splined shaft connected to the first outer yoke. Thus, this ensures a simple rotationally fast, but axially displaceable arrangement of the first coupling element relative to the first outer yoke.

A centering portion, with a cylindrical outer face of the splined shaft, can axially project from an end face of the first coupling element. The end face faces away from the first universal joint. The centering portion engages a suitable bore in the second coupling element in order to center the two coupling elements before the first coupling element is made to engage the second coupling element.

At an end face facing away from the first universal joint, the first coupling element may include first driving claws. The driving claws, in the coupled condition, engage corresponding gaps between the second driving claws of a second coupling element.

Furthermore, the coupling element may include an outer circumferential groove. The groove holds the coupling element in the uncoupled condition in a holding device which engages the outer circumferential groove. Therefore, the first coupling element, when in the uncoupled condition, can be deposited in a holding device. Furthermore, the pressure spring ensures that neither of the two universal joints is articulated due to its deadweight. This is because the pressure spring holds the first universal joint in its aligned condition. Thus, the second universal joint cannot be articulated, provided the coupling device, via the second outer yoke, is connected to a shaft journal or a similar attaching element, such as a gear box.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
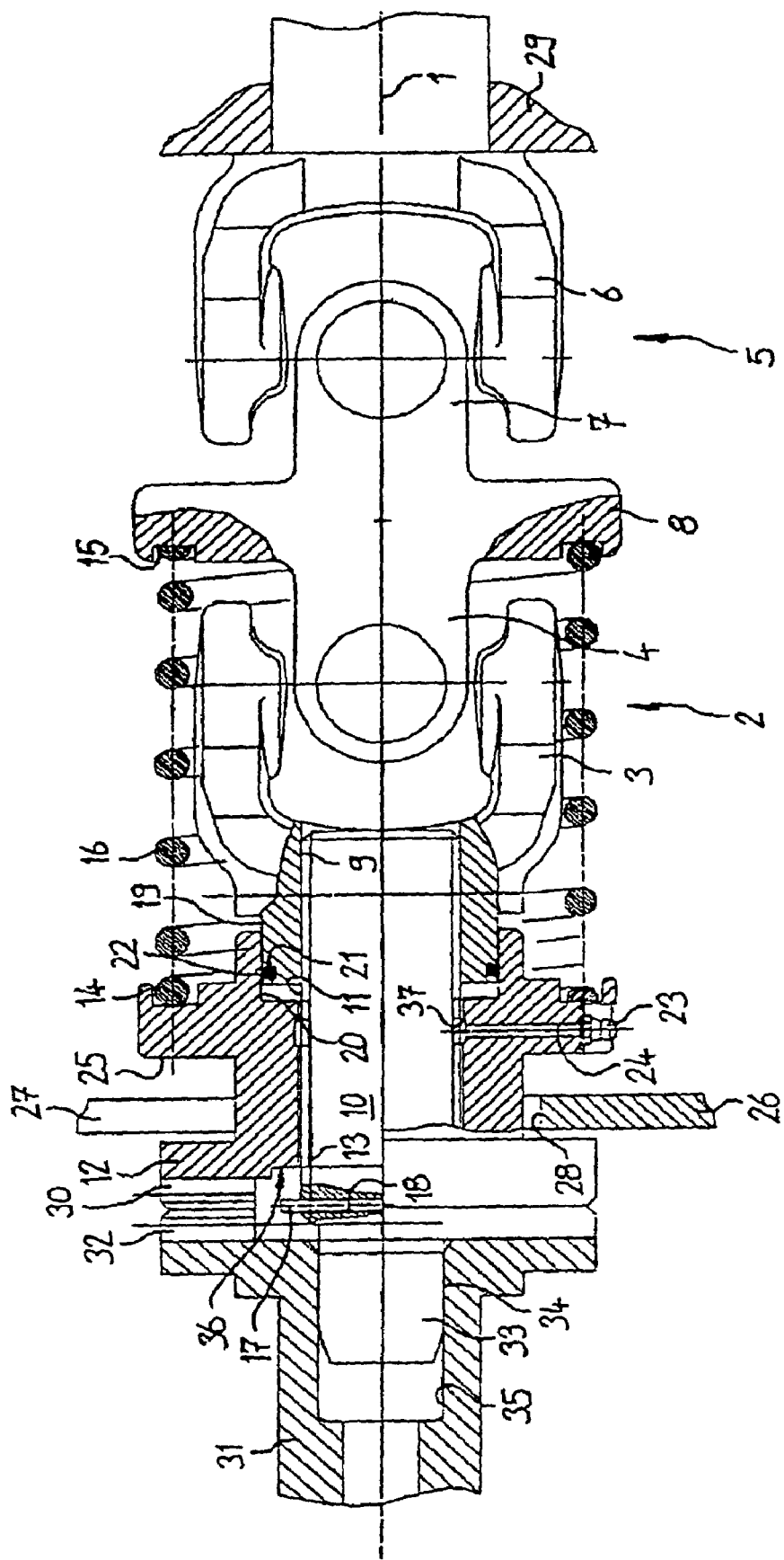
FIG. 1 is a longitudinal section view of an inventive coupling device with a first coupling element in an uncoupled condition.
Figure 2:
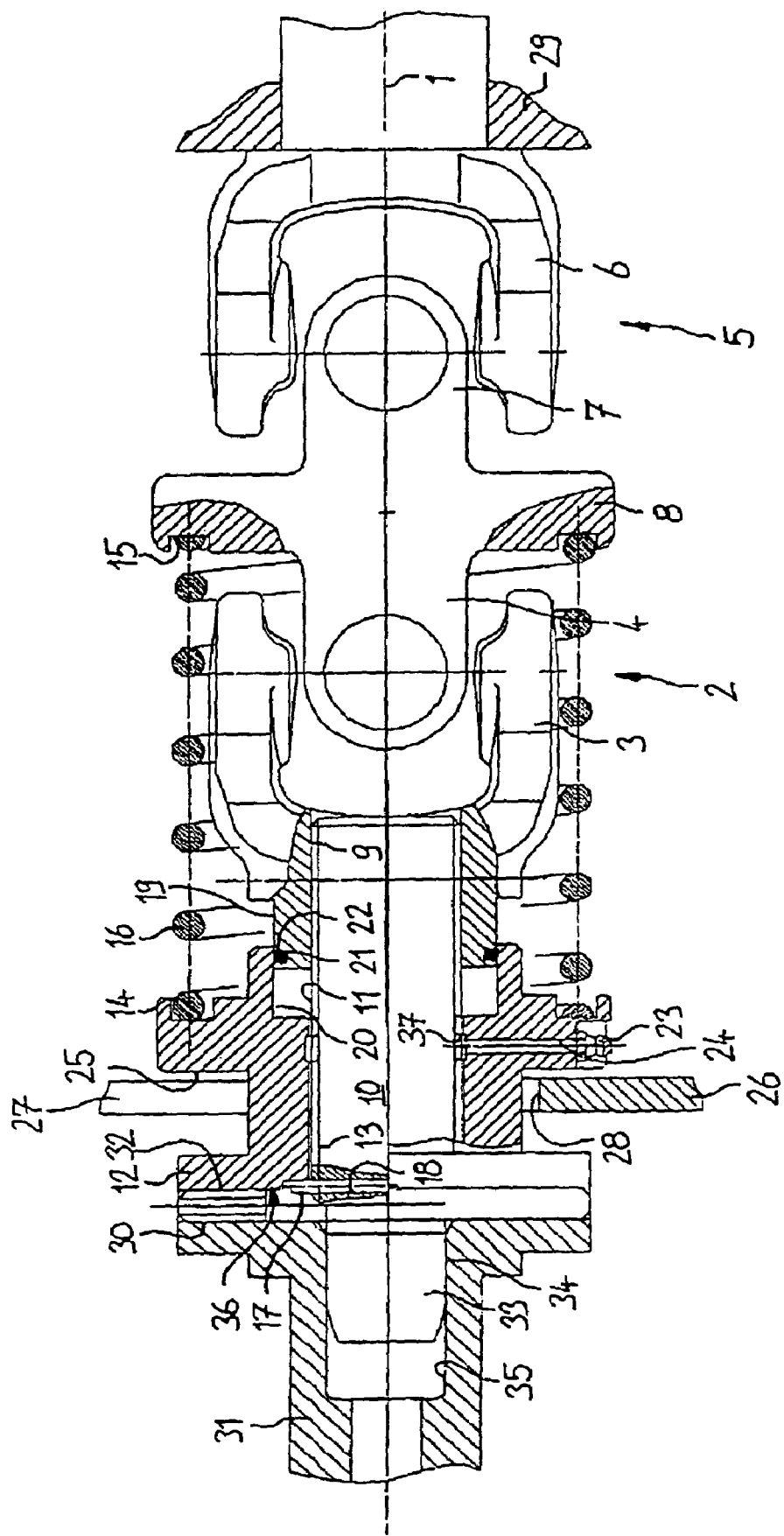
FIG. 2 is a view like FIG. 1 with the first coupling element in a coupled condition.
Figure 3:
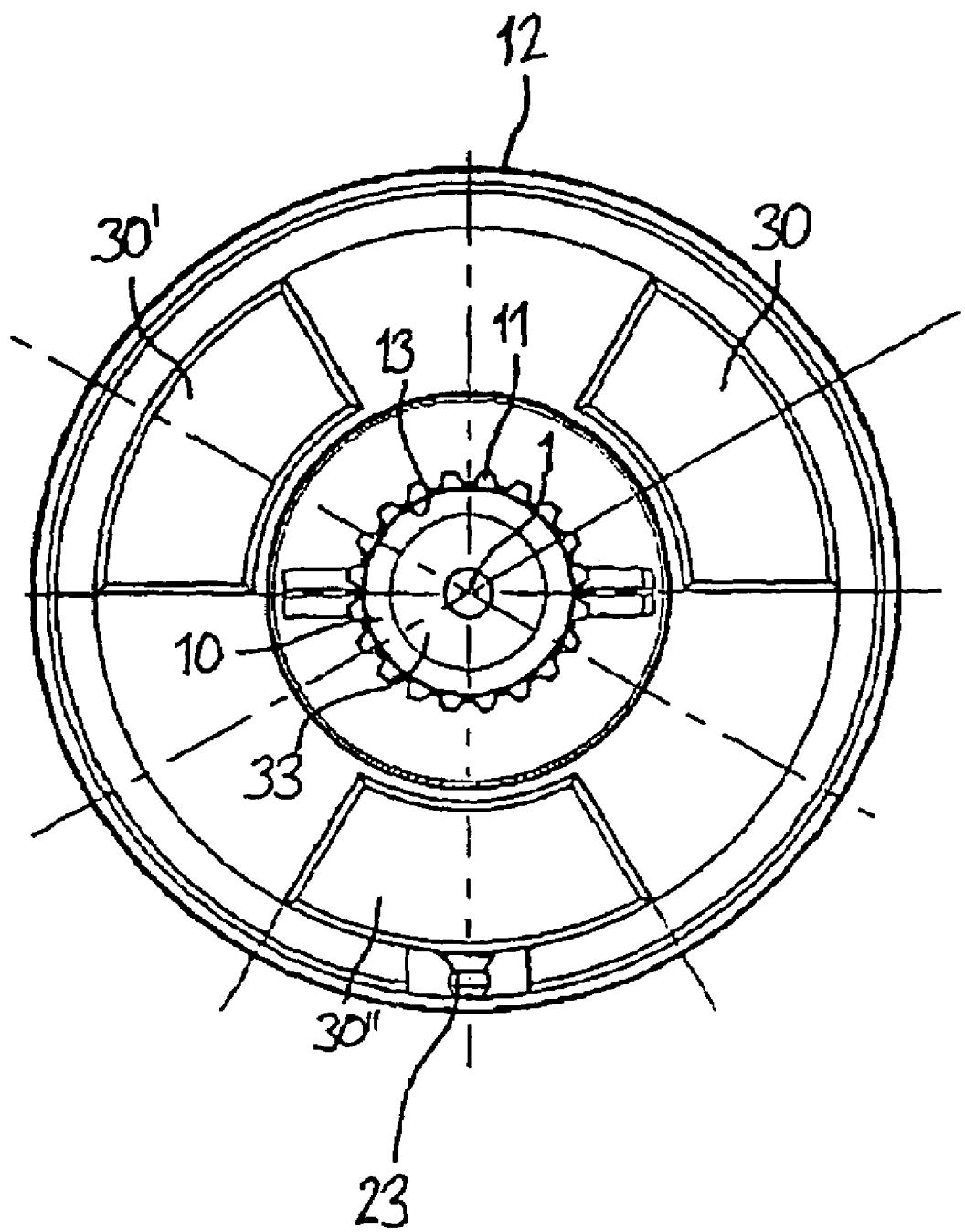
FIG. 3 is a front view of a first coupling element.

FIGS. 1 to 3 will be described jointly below. The drawings show an inventive coupling device which is rotatable around a longitudinal axis 1. The coupling device comprises a first universal joint 2 with a first outer yoke 3 and a first inner yoke 4. The first outer yoke 3 and the first inner yoke 4 are connected to one another by a cross member which, for reasons of clarity, is not shown.

Furthermore, the coupling device includes a second universal joint 5 with a second outer yoke 6 and a second inner yoke 7. The second outer yoke 6 and the second inner yoke 7 are also connected to one another by a cross member which, for reasons of clarity, is also not shown.

The two inner yokes 4, 7 are designed so as to be integral with a base member 8. The two inner yokes 4, 7 are arranged to face away from one other. The base member 8 is disk-shaped and arranged coaxially relative to the axis of rotation 1.

The first outer yoke 3 includes a bore 9 which receives a splined shaft 10. The splined shaft 10 has longitudinal teeth 11 which engage corresponding longitudinal teeth of the bore 9. This ensures a rotationally fast connection between the splined shaft 10 and the first outer yoke 3. In order to axially secure the splined shaft 10 inside the bore 9, a prior art securing means, such as securing pins, extend transversely to the longitudinal axis 1. This means that the splined shaft 10 is held in the bore 9 in a rotationally fast and axially non-displaceable way.

At the end facing away from the second universal joint 5, the splined shaft 10 projects from the bore 9. The part of the splined shaft 10 which projects from the bore 9 is arranged as a first coupling element 12 that it is axially displaceable along the longitudinal axis 1. The first coupling element 12, via a bore 13, is positioned on the splined shaft 10. The bore 13 includes longitudinal teeth which correspond to the longitudinal teeth 11 of the splined shaft 10. This ensures a rotationally fast connection. Furthermore, the splined shaft 10 projects beyond the end face 36 of the first coupling element 12.

The first coupling element 12 forms a circular-ring-shaped first supporting face 14. The supporting face 14 faces the base member 8 and is arranged coaxially relative to the longitudinal axis 1. The base member 8 forms a second supporting face 15. The second supporting face 15 is also circular-ring-shaped and is arranged coaxially relative to the longitudinal axis 1. The second supporting face 15 faces the first supporting face 14. A pressure spring 16 is axially supported against the first supporting face 14 and the second supporting face 15. The pressure spring 16 is pretensioned between the two faces. The first coupling element 12 is thus loaded towards a coupling position as illustrated in FIG. 2. In the coupling position, the first coupling element 12 is axially supported against a dowel pin 17, which is positioned in a bore 18 of the splined shaft 10. Furthermore, the pressure spring 16 ensures that the universal joint 2 is held in an aligned position.

The first coupling element 12 has a bore 20 which faces the first outer yoke 3. The bore 20 is positioned on a cylindrical seat portion 19 of the first outer yoke 3. A sealing ring 21 is arranged in a groove 22 of the seat portion 19. The ring 21 seals the bore 20 relative to the first coupling element 12.

A lubricating nipple 23 is provided in the first coupling element 12. The lubricating nipple 23 is connected to a radial bore 24 that leads to a lubricating groove 37 in the bore 13. The groove 37 is open towards the longitudinal teeth 11 of the first coupling element 12. Thus, it is possible to lubricate the longitudinal teeth 11 between the first coupling element 12 and the splined shaft 10.

Furthermore, the coupling element 12 includes an outer circumferential groove 25. The circumferential groove 25 enables the first coupling element 12 to be arranged in a recess 27 of a holding device 26. In the uncoupled condition, the first coupling element 12 is deposited on a supporting face 28 formed by the holding device 26. The pressure spring 16 holds the first universal joint 2 in an aligned position. This ensures that the two universal joints 2, 5 cannot be articulated when the first coupling element 12 is deposited in the holding device 26. Furthermore, the second outer yoke 6 is held in a housing 29 so as to be rotatable around the longitudinal axis 1. The outer circumferential groove 25 is wider than the holding device 26 to ensure that the first coupling element 12 does not need to be moved completely out of the holding element 26 when the first coupling element 12 is coupled to a second coupling element 31. Thus, the first coupling element 12 can be freely axially moved within the holding device 26.

The coupling element 12, at its end face, carries first driving claws 30 which face away from the second universal joint 5. In a coupled position as shown in FIG. 2, the driving claws 30 engage gaps between second driving claws 32 of a second coupling element 31. Thus, it is possible to transmit torque between the two coupling elements 12, 31. The pressure spring 16 ensures that, in case the first driving claws 30 and the second driving claws 32 abut one another at their end faces, the first coupling element 12 is displaced against the spring force of the pressure spring 16 initially into the uncoupled position as illustrated in FIG. 1. Upon the two coupling elements 12, 31 rotating relative to one another, the driving claws 30, 32 are able to engage corresponding gaps between the driving claws of the respective other coupling element. In this position, the first coupling element 12 is axially transferred into the coupled position as shown in FIG. 2. It is held so that the driving claws 30, 32 engage one another.

A centering portion 33 on the splined shaft 10 ensures that, during the coupling process, even when the first coupling element 12 is in the uncoupled position, the first coupling element 12 is centred relative to the second coupling element 31. The centering portion 33 includes a cylindrical outer face and projects axially towards the second coupling element 31. The centering portion 33 engages a centrally arranged centring bore 35 of the second coupling element 31.

Since the two inner yokes 4, 7 are connected to one another, via the disc-shaped base member 8, it is possible to achieve a very short length. Furthermore, it is sufficient to provide a short pressure spring 16. Thus, the coupling device is also suitable for high rotational speeds since short pressure springs are less likely to bulge at high rotational speeds.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coupling device, used for driving, or in drives of, agricultural implements or machinery, comprising:
    a first universal joint with a first outer yoke with two arms and a first inner yoke connected to the two arms of said first outer yoke;
    a second universal joint with a second outer yoke with two arms and a second inner yoke connected to the two arms of said second outer yoke;
    a connecting member for connecting the first inner yoke and the second inner yoke to one another in a rotationally fast way;
    a first coupling element connected to the first outer yoke in a rotationally fast way, said first coupling element including at least one first driving member;
    a second coupling element, said second coupling element including at least one second driving member, said second driving member driving said first and second universal joints via said first driving member;
    a pressure spring axially supported against and pretensioned between a supporting element and said first coupling element, said supporting element forming part of the connecting member; and
    a longitudinal adjusting mechanism enabling an axial displacement of the first coupling element relative to the supporting element for axially engaging or disengaging said first coupling element first driving member with said second coupling element second driving member said pressure spring biasing said first driving member into engagement with said second driving member.

2. A coupling device according to claim 1, wherein said first coupling element is axially displaceably guided on a displacement portion of the first outer yoke and said first inner yoke and the second inner yoke are axially non-displaceable connected to one another.

3. A coupling device according to claim 2, wherein said first inner yoke and said second inner yoke are integrally connected to one another via a base member to form a double yoke and said base member being said connecting member.

4. A coupling device according to claim 1, wherein said first coupling element is axially displaceably guided on a splined shaft which is connected to the first outer yoke.

5. A coupling device according to claim 4, wherein a centering portion with a cylindrical outer face, coupled with the splined shaft, projects from an end face of the first coupling element, said end face faces away from the first universal joint.

6. A coupling device according to claim 1, wherein at an end face facing away from the first universal joint, the first coupling element comprises first driving claws, said first driving claws in a coupled condition engage gaps between second driving claws of said second coupling element.

7. A coupling device according to claim 1, wherein said first coupling element comprises an outer circumferential groove for holding the first coupling element in an uncoupled condition in a holding device.

* * * * *